(12) United States Patent
Bigorra Llosas et al.

(10) Patent No.: US 7,781,499 B2
(45) Date of Patent: Aug. 24, 2010

(54) PROCESS FOR OBTAINING AQUEOUS COMPOSITIONS COMPRISING CURING EPOXY AGENTS

(75) Inventors: Joaquin Bigorra Llosas, Sabadell (ES); Andres Ortuno, Barcelona (ES); Luis Llaurado, Barcelona (ES); Jose Manuel Hierro, Barcelona (ES); Giorgio Sabbadini, Rho (IT)

(73) Assignee: Cognis IP Management GmbH, Duesseldorf (DE)

( * ) Notice: Subject to any disclaimer, the term of this patent is extended or adjusted under 35 U.S.C. 154(b) by 706 days.

(21) Appl. No.: 11/650,056

(22) Filed: Jan. 5, 2007

(65) Prior Publication Data

US 2007/0191512 A1   Aug. 16, 2007

(30) Foreign Application Priority Data

Jan. 5, 2006 (EP) .................................. 06000159

(51) Int. Cl.
  *C08L 63/00* (2006.01)
  *B32B 27/38* (2006.01)
(52) U.S. Cl. ..................... 523/404; 523/402; 523/403; 523/414; 523/420; 523/428
(58) Field of Classification Search ........................ None
  See application file for complete search history.

(56) References Cited

U.S. PATENT DOCUMENTS

| 3,249,412 | A | | 5/1966 | Kolek et al. | |
|---|---|---|---|---|---|
| 3,301,804 | A | | 1/1967 | Zora et al. | |
| 3,634,348 | A | | 1/1972 | Carter | |
| 3,732,309 | A | * | 5/1973 | Garnish et al. | 564/305 |
| 3,914,288 | A | * | 10/1975 | Garnish et al. | 560/127 |
| 4,066,392 | A | | 1/1978 | Abel et al. | |
| 4,246,148 | A | | 1/1981 | Shimp et al. | |
| 4,315,044 | A | | 2/1982 | Elmore et al. | |
| 4,522,962 | A | * | 6/1985 | Abbey et al. | 523/410 |
| 4,582,889 | A | * | 4/1986 | Yamaguchi et al. | 528/59 |
| 4,608,406 | A | | 8/1986 | William, Jr. et al. | |
| 5,430,112 | A | * | 7/1995 | Sakata et al. | 525/526 |
| 5,444,127 | A | | 8/1995 | Miskel, Jr. et al. | |
| 6,077,884 | A | * | 6/2000 | Hess et al. | 523/417 |
| 6,245,835 | B1 | | 6/2001 | Klein et al. | |
| 6,303,672 | B1 | * | 10/2001 | Papalos et al. | 523/414 |
| 7,094,816 | B2 | | 8/2006 | Hoefer et al. | |
| 7,132,483 | B2 | | 11/2006 | Nagorny et al. | |
| 2004/0170833 | A1 | | 9/2004 | Hoefer et al. | |
| 2004/0170834 | A1 | | 9/2004 | Nagorny et al. | |
| 2005/0154091 | A1 | | 7/2005 | Lohe et al. | |

FOREIGN PATENT DOCUMENTS

| EP | 0 932 648 B1 | 6/2004 |
|---|---|---|
| EP | 1 426 347 A1 | 6/2004 |
| EP | 1 426 348 A1 | 6/2004 |
| EP | 1 379 597 B1 | 8/2004 |
| EP | 1 392 784 B1 | 9/2004 |
| EP | 1 238 028 B1 | 10/2004 |
| WO | WO 93/21250 A1 | 10/1993 |

OTHER PUBLICATIONS

Hartman et al., "Mercaptans: An Added Dimension For Epoxy Coatings", Presented at the Western Coatings Societies' Symposium and Show, Monterey, California, (Feb. 23, 1987), pp. 1-25.

* cited by examiner

*Primary Examiner*—Michael J Feely

(57) ABSTRACT

A process for obtaining aqueous compositions including curing epoxy agents includes providing an aqueous mixture comprising at least one polymercaptan, at least one di- or poly(amido)amine, and water, and reacting the aqueous mixture with an uncured epoxy resin to form a final cured epoxy resin is provided. A process for obtaining aqueous compositions including curing epoxy agents includes providing an aqueous mixture of at least one waterpoxy treated with at least one polymercaptan, and reacting the aqueous mixture with an uncured epoxy resin to form the final cured epoxy resin is also provided.

3 Claims, No Drawings

PROCESS FOR OBTAINING AQUEOUS COMPOSITIONS COMPRISING CURING EPOXY AGENTS

CROSS-REFERENCE TO RELATED APPLICATIONS

This application claims priority under 35 U.S.C. §119 from European Patent Application No. 06000159.1, filed Jan. 5, 2006.

FIELD OF THE INVENTION

The present invention relates generally to a process for obtaining aqueous compositions comprising curing epoxy agents, and more particularly, to an improved process for obtaining aqueous compositions of curing epoxy agents for adhesive and coating compositions.

BACKGROUND INFORMATION

Epoxy resins are organic substances or mixtures of organic substances which generally contain two or more (mostly isolated, generally terminal) epoxy groups per molecule and which can be cross-linked by reaction of those epoxy groups to form thermoset molding compositions. The formation of cured epoxy resins is known from the state of the art. A very common method for obtaining a suitable uncured epoxy resin is the very well known reaction of bisphenol-A with 2 moles of epichlorohydrin, which takes place in the presence of sodium hydroxide.

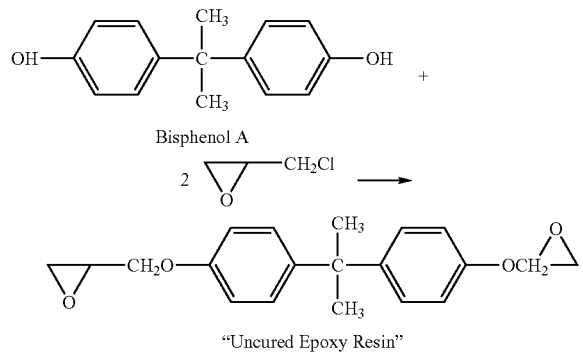

The epoxy resins of the bisphenol A/epichlorohydrin type—generally referred to as "bis-A-resins" represent of course the most common product, followed by bisphenol F/epichlorohydrin resins. Commercially available uncured epoxy resins generally have a relatively low molecular weight and are converted into high molecular weight materials by chemical reaction through the addition of a so-called hardener. Accordingly, the hardener promotes cross-linking therefore, it was originally proposed to refer to the epoxy resins before cross-linking as pre-condensates or intermediates rather than resins. However, this nomenclature has never been adopted. The expression "uncured epoxy resin" is now widely used for the straight resin while the expression "cured epoxy resin" is reserved for the cross-linked product.

For transforming the intermediates into the cured resins the oxirane rings are opened and, in many cases, the free valencies are attached to other functional groups present in the epoxy resin with incorporation of the hardener. Cross-linking takes place by polyaddition or polymerization without the elimination of solid, liquid or gaseous substances, so that bubble formation is avoided, even in the absence of pressure, and very little shrinking occurs. Numerous substances are known as suitable hardeners from the prior art, however, of particular importance are reactive amines, especially polyamines. The schema illustrates the reaction by a simple example of epoxy and amine reaction:

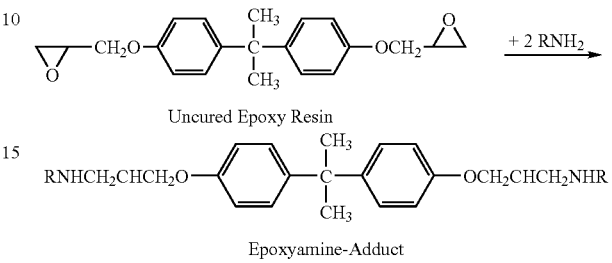

Usually di- or polyamines like e.g. diethylentriamine are used, thus one does not only obtain a linear molecule but a mixture of branched polymers, which are known as epoxyamine-adducts, some of them also called "waterpoxys". For example, US 20050154091 A1 (Lohe et al.) describes a method of preparation of a water based epoxy resin curing agent in dispersion form which water based curing agent is formed by combining an active amine-hydrogen containing amine-functional dispersion (A) with an active amine-hydrogen containing amine-functional curing agent (B) in solution or emulsion form, wherein said active amine-hydrogen containing amine-functional dispersion (A) comprises a reaction product of a) a polyamine compound having at least three active amine-hydrogen, and b) an aqueous epoxy resin dispersion having an epoxy solids equivalent weight of equal to or greater than 150 g/eq, and wherein said active amine-hydrogen containing amine-functional curing agent (B) has a solids hydrogen equivalent weight of 50-500 g/eq; is capable of emulsifying a liquid epoxy resin to produce a stable emulsion.

Waterpoxys represent low molecular intermediates which are converted into the final products ("Cured Epoxy Resins"), which are useful as adhesives, coatings or flooring agents by reaction with uncured epoxy resins, optionally in the presence of hardeners, in particular short chain polyamines.

Mercaptan hardeners represent commercially available products and their advantages are e.g. described in the monography "Mercaptans: An added dimension of epoxy coatings" by S. Hartman and R. Dallago published by the company Henkel Corp., which is a summary of a lecture given at a symposium on Feb. 23, 1987. In particular, this paper shows that the product "Capcure" offers many advantages over conventional hardeners for epoxy resins. Cured epoxy resins obtained from waterpoxys and capcures are e.g. described in EP 0932648 B1, EP 1238028 B1, EP 1379597 B1, EP 1392784 B1, EP 1426347 A1, and EP 1426348 A1 (all Cognis) which in are hereby incorporated by reference.

A serious disadvantage, however, is that the cured epoxy resins represent solids and so far are not available as aqueous dispersions or emulsions, since they show a strong tendency to precipitate. Since on the other hand it would be highly desirable to apply said cured epoxy resins out of an aqueous composition the problem which underlies the present invention has been to modify the existing process for obtaining cured epoxy resins so that the resulting products can be offered in the form of emulsions or dispersions with at least comparable storage stability, while at the same time providing a better solvent resistance, a significant shorter gel time even at low temperature, no shrinkage, and more flexibility.

SUMMARY OF THE INVENTION

Briefly described, according to an aspect of the invention, a process for obtaining aqueous compositions including curing epoxy agents includes providing an aqueous mixture comprising at least one polymercaptan, at least one di- or poly(amido)amine, and water, and reacting the aqueous mixture with an uncured epoxy resin to form a final cured epoxy resin.

In another aspect of the invention, a process for obtaining aqueous compositions including curing epoxy agents includes providing an aqueous mixture of at least one waterpoxy treated with at least one polymercaptan, and reacting the aqueous mixture with an uncured epoxy resin to form the final cured epoxy resin.

DETAILED DESCRIPTION OF THE INVENTION

The present invention claims a process for obtaining aqueous compositions comprising curing epoxy agents, which is characterised in that (a1) polymercaptans, di- or poly(amido)amines, and water are mixed to form an aqueous Premix A, and (a2) said aqueous Premix A is reacted with an uncured epoxy resin, optionally in the presence of water, in order to form the final cured epoxy resin, or (b1) an aqueous mixture of waterpoxys is treated with polymercaptans in order to form an aqueous Premix B, and (b2) said aqueous Premix B is reacted with uncured epoxy resins, optionally in the presence of water, in order to form the final cured epoxy resin.

Surprisingly it has been found that the emulsions obtained according to the present invention do not precipitate and in addition exhibit a number of advantageous properties which make them superior compared to the products as known from the state of the art and found in the market. Particularly, the advantages can be seen in a better solvent resistance, a significant shorter gel time even at low temperature, no shrinkage, more flexibility, while the hardness development is of the same quality. Thus, the emulsions obtained from the process of the present invention solve the complex problems underlying the invention as set out above.

Uncured Epoxy Resins

As explained above, uncured epoxy resins represent reactive intermediates for the production of the final cured epoxy resins which preferably comprise at least two glycidylether groups in the molecule. More particularly suitable uncured epoxy resins include glycidyl polyethers of dihydric phenols as well as epoxy novolac resins. The dihydric phenols employed to prepare the epoxy resins are further described in U.S. Pat. No. 4,246,148. It is particularly preferred to employ those reaction products of epichlorohydrin with glycidyl polyethers wherein the dihydric phenol is bisphenol. Examples of suitable resins include those disclosed in U.S. Pat. Nos. 3,249,412, 3,301,804, 3,634,348, 4,315,044, and 4,608,406, the disclosures of all incorporated herein by reference.

The maximum molecular weight of the epoxy resins is limited by the fact that the amount of epoxy resin employed in the second component is usually selected to achieve stoichiometric equivalence of epoxy groups with the amine hydrogen equivalents of the curing agent. Consequently, as the molecular weight of the epoxy resin increases, thereby increasing the epoxide equivalent weight, more of the epoxy resin is required to satisfy the stoichiometric requirement. However, the use of large amounts, particularly of higher molecular weight epoxy resins, is not preferred because they are water insoluble and become increasingly more difficult to microemulsify or disperse as the amount thereof is increased. In view of the above, it is preferred to characterize the epoxy resin also in terms of its epoxide equivalent weight. Thus, the epoxide equivalent weight (EEW) of the glycidyl polyethers of dihydric phenols is not greater than about 2000, preferably from about 180 to about 700. As described above, the amount of epoxy resin which is present in the coating composition is preferably sufficient to achieve substantially stoichiometric equivalence with the reactive amino hydrogens on the end capped epoxy-amine adduct. In general, it is preferred to employ the epoxy resin in an amount sufficient to achieve an epoxy to reactive amine hydrogen equivalent weight ratio of from about 0.5:1.0 to about 1.5:1.0, and, preferably, from about 0.8:1.0 to about 1.2:1. The epoxy resins which are useful herein may be either liquids or solids, so long as the resin is in the form of a stable aqueous dispersion or are readily emulsifiable.

Waterpoxys

Waterpoxys represent condensation products of the uncured epoxy resins and di- or polyamines. In order to avoid ambiguities it is set out that the phrase "di- or polyamines" also encompasses amidoamine structures. The preferred waterpoxys, however, represent condensation products of uncured epoxy resins and diethylene triamine (DETA), like e.g. Waterpoxy® 751, or Waterpoxy® 1401 (Cognis Corp.).

Polymercaptans

Polymercaptans represent a complex mixture with no defined structure. They are obtainable in the market under the trademark Capcure®, particularly Capcure® 3-800 and Capcure® LOF (Cognis).

Premix A

In a first embodiment of the present invention Premix A is obtained by mixing polymercaptans and di- or polyamines in weight ratio of either 1:99 to 10:90 or 70:30 to 90:10 in the presence of water to obtain an aqueous composition. Subsequently, the mixture thus obtained and the un-reacted epoxy resins are mixed—optionally in the presence of another part of water—in a weight ratio of preferably 20:80 to 80:20 to obtain the final cured epoxy resin.

Premix B

In a second embodiment of the present invention Premix B is obtained by mixing an aqueous composition of waterpoxys and polymercaptans in a weight ratio of preferably 1:99 to 10:90 or 70:30 to 90:10. Subsequently, the aqueous mixture thus obtained and the non-aqueous un-reacted epoxy resins are mixed in a weight ratio of preferably 20:80 to 80:20 to obtain the final cured epoxy resin.

Curing Process

In a preferred embodiment of the present invention the curing of Premix A or B with the uncured epoxy resins is, optionally carried out in the presence of a polyamine catalyst, which can be the same as used for the transformation of the uncured epoxy resins into the waterpoxys. Useful accelerators for amine curing agents include tertiary amines, e.g. N,N'-bis(3-(dimethylamino)propyl)-urea, which was used in the examples below. The use of this tertiary amine has been described by Miskel et al. in U.S. Pat. No. 5,444,127, which is incorporated herein by reference. Other commercially available tertiary amines that may be used as cure catalysts include 2,4,6 tri(dimethylaminomethyl)phenol, dimethylaminomethylphenol, benzyldimethylamine, pyridine, triethylamine, triethylene diamine and the like. The working amount can be 0.1 to 10, preferably 1 to 3% b.w. calculated on the total amount of actives in the curing mixture.

INDUSTRIAL APPLICATION

The aqueous emulsion obtained according to the inventive process exhibits a better performance than those known from the state of the art. Particularly, the advantages can be seen in a better solvent resistance, a significant shorter gel time even at low temperature, less shrinkage, more flexibility, while the hardness development is of the same quality. Another object of the present invention is therefore directed to the use of said emulsions as an adhesive, a flooring or coating composition.

EXAMPLES

Example 1 and Comparative Example C1

Aqueous Two Component Epoxy Coatings

According to the present invention two components were prepared. Component A: 100 grams of an epoxy resin (reaction of Bisphenol-A and Epichlorohydrin) having an average epoxy equivalent of 190 (Chem Res E-20, Cognis Spa). Component B: 114 g of an amine based curing agent in water solution (Waterpoxy® 751 from Cognis Spa) was mixed with 6 g of polymercaptan (Capcure® 3-800 from Cognis Iberia, S.L.) at room temperature during 1 minute. The mixture of 100 g component A and 100 g component B was cured at different temperatures to give the final epoxy coating (Product A1).

For comparison 100 grams of an epoxy resin (reaction of Bisphenol-A and Epichlorohydrin) having an average epoxy equivalent of 190 (Chem Res E-20, Cognis Spa) was mixed with 120 g of an amine based curing agent in water solution (Waterpoxy® 751, Cognis Spa) at room temperature during 1 minute. Subsequently, the mixture was cured at different temperatures to give the final epoxy coating (Product B1).

The two products thus obtained were compared with respect to their application properties. The results are shown in Table 1.

TABLE 1

Properties of the aqueous epoxy coatings

|  | Product A1 | Product B1 |
|---|---|---|
| Composition [parts] | | |
| Chem Res E-20 | 100 | 100 |
| Waterpoxy ® 751 | 114 | 120 |
| Capcure ® 3-800 | 6 | — |
| Gel time [min] | | |
| 100 g, 20° C. | 43 | 55 |
| 100 g, 5° C. | 58 | 140 |
| Hardness (Shore D) | | |
| 100 g, 20° C., 1 d | 60 | 60 |
| 100 g, 20° C., 1 w | 68 | 65 |
| 100 g, 5° C., 1 d | 15 | 15 |
| 100 g, 5° C., 1 w | 45 | 27 |
| Solvent resistance [Weight increase by %] | | |

TABLE 1-continued

Properties of the aqueous epoxy coatings

|  | Product A1 | Product B1 |
|---|---|---|
| Water, 1 w | 0.3 | 0.9 |
| Ethanol (96%) | 0.2 | 2.4 |
| Xylene | None | 0.8 |

In addition, it was observed that a film of 300 µm of Comparative Product B showed a heavy shrinkage within 2 days, while the same film of Inventive Product A exhibited only a slight shrinkage after 1 week. The comparison shows that the product according to the invention shows a better solvent resistance, a significant shorter gel time even at low temperature, no shrinkage, more flexibility, while the hardness development is of the same quality. The product therefore fulfils perfectly the requested profile for an improved flooring or coating agent.

Example 2 and Comparative Example C2

Non-aqueous Two Component Epoxy Adhesive

According to the present invention two components were prepared. Component A: 100 grams of an epoxy resin (reaction of Bisphenol-A and Epichlorohydrin) having an average epoxy equivalent of 190 (Chem Res E-20, Cognis Spa). Component B: 80 g of polymercaptan (Capcure 3-800, Cognis Iberia S.L.) was mixed with 20 g of an amine based curing agent in water solution (Waterpoxy® 751, Cognis Spa) and 5 g of tertiary amine (Versamine® EH-30, Cognis Iberia, S.L.) at room temperature during 1 minute (Product A2).

For comparison a second product was prepared. Component A: 100 grams of an epoxy resin (reaction of Bisphenol-A and Epichlorohydrin) having an average epoxy equivalent of 190 (Chem Res E-20, Cognis Spa). Component B: 100 g of polymercaptan (Capcure® 3-800, Cognis Iberia S.L.) was mixed with 5 g of tertiary amine (Versamine® EH-30, Cognis Iberia S.L.) at room temperature during 1 minute (Product B2).

The two products thus obtained were compared with respect to their application properties. The results are shown in Table 2.

TABLE 2

Properties of the aqueous epoxy coatings

|  | Product A2 | Product B2 |
|---|---|---|
| Composition [parts] | | |
| Chem Res E-20 [parts] | 100 | 100 |
| Waterpoxy ® 751 | 20 | — |
| Capcure ® 3-800 | 80 | 100 |
| Versamine ® EH-30 | 5 | 5 |
| Gel time [min] | | |
| 100 g, 20° C. | 4 | 4 |
| Hardness (Shore D) | | |
| 100 g, 20° C., 1 d | 48 | 79 |
| 100 g, 20° C., 1 w | 50 | 79 |
| Solvent resistance [Weight increase by %] | | |
| Ethanol (96%) | 6.6 | 11.6 |
| Xylene | 0.6 | 0.6 |

In addition, it was observed that a film of 300 μm of inventive Product A2 maintained flexibility over a period of at least 15 days, while comparative Product B didn't show any flexibility after 1 day of storage.

What is claimed is:

1. A process for obtaining aqueous compositions comprising curing epoxy agents, the process comprising the steps of:
   (a) providing an aqueous mixture comprising at least one polymercaptan; at least one amine component selected from the group consisting of diamines, polyamines, amidodiamines and amidopolyamines; and water; and
   (b) reacting said aqueous mixture with an uncured epoxy resin to form a final cured epoxy resin, wherein said polymercaptan and said amine component are present in a weight ratio of 1:99 to 10:90.

2. A process for obtaining aqueous compositions comprising curing epoxy agents, the process comprising the steps of:
   (a) providing an aqueous mixture comprising at least one polymercaptan; at least one amine component selected from the group consisting of diamines, polyamines, amidodiamines and amidopolyamines; and water; and
   (b) reacting said aqueous mixture with an uncured epoxy resin to form a final cured epoxy resin, wherein the weight ratio of said polymercaptan and said amine component is 70:30 to 90:10.

3. A process for obtaining aqueous compositions comprising curing epoxy agents, the process comprising the steps of:
   (a) providing an aqueous mixture of at least one epoxy-amine adduct and at least one polymercaptan, and
   (b) reacting said aqueous mixture with an uncured epoxy resin to form the final cured epoxy resin, wherein said epoxy-amine adduct comprises a condensation product of an uncured epoxy resin and an amine component selected from the group consisting of amidodiamines and amidopolyamines.

* * * * *